United States Patent [19]
Schwartz

[11] 3,723,991
[45] Mar. 27, 1973

[54] OVERSIZE FILAMENT THICKNESS DETECTOR, PARTICULARLY EXCESSIVE THREAD THICKNESS AND KNOT DETECTOR FOR YARNS

[75] Inventor: Hermann Schwartz, Adliswil, Switzerland

[73] Assignee: Siegfried Peyer, Bach, Switzerland

[22] Filed: Oct. 1, 1970

[21] Appl. No.: 77,189

[30] Foreign Application Priority Data

Oct. 31, 1969  Switzerland.......................16253/69

[52] U.S. Cl. ..................340/259, 340/271, 226/100
[51] Int. Cl. ................................................B65h 63/06
[58] Field of Search..............................340/259, 271

[56] References Cited

UNITED STATES PATENTS 3,527,965  9/1970  Hawkins et al. ..................340/271 X
3,105,405  10/1963  Bessonny........................340/259 X Primary Examiner—John W. Caldwell
Assistant Examiner—Glen R. Swann, III
Attorney—Flynn & Frishauf

[57] ABSTRACT

An output signal proportional in amplitude to excessive thread thickness, or knots, and proportional in time to the length of the excessive thickness is obtained from a transducer and applied to a first threshold detector providing a pulse if the excessive thickness exceeds a certain level and to a timing circuit providing a gradually rising signal proportional to time of persistance of the excessive thickness. To compensate for speed variations during start-up of the apparatus, for example after shut-down due to elimination of an excessive thickness of excessive length, a wave shaping signal transfer circuit is incorporated in the timing circuit, consisting for example of an R-C network having a charge-time characteristic similar to the acceleration function of the spooling equipment.

10 Claims, 5 Drawing Figures

Patented March 27, 1973 3,723,991

OVERSIZE FILAMENT THICKNESS DETECTOR, PARTICULARLY EXCESSIVE THREAD THICKNESS AND KNOT DETECTOR FOR YARNS

The present invention relates to an electronic apparatus to detect excessive thickness of filamentary materials, particularly textile yarns, so that undesired, thickened portions within the filamentary material, typically yarn, can be cut out. The apparatus is typically used with cross wound machines in which the yarn is spooled from small spun cops on cross wound spools suitable for use in commerce, or for further processing. A capacitive, or optic-electronically operating transducer head has yarn passed therethrough, which provides electrical signals corresponding to deviation of yarn thickness from a desired norm.

A customary electronic apparatus receiving such signals includes an amplifier and a first voltage discriminator, or threshold detector, having a threshold which is so adjusted that all signals which have a level corresponding to normal thickness of the thread are suppressed. Statistical sampling of yarn defect shows that there are many more thick portions of substantial thickening, but of very short length (a few millimeters) than portions in which the thickening is comparatively small but extends over a substantial length, such as several centimeters. Any increase in thickness extending over a substantial length is much more disadvantageous in subsequent working with the yarn than short thickened stretches, such as knots, even if the thickness of such short defects is greater than that of the long thickened stretches. Thus, modern electronic yarn testing apparatus further includes a second discriminator, or threshold detector, which has an adjustable threshold value testing the time during which signals indicative of excessive thickness persist. The second threshold detector discriminates with respect to signals which persist only beyond a predetermined period of time. Thus, an apparatus having both an amplitude and a time discriminator will select, as output, only those signals which have an amplitude exceeding a predetermined level and, additionally, which persist over a certain predetermined period of time. These signals are then transmitted to a cutting apparatus in which that portion of the yarn is cut out which has been the cause of the sensed signals.

The electronic apparatus can readily discriminate against signals representative of excessive thickness of the yarn, with an easily predetermined factor of proportionality of the signal with respect to yarn thickness. The time duration of the signal, however, depends on the running time of the yarn defect through the sensing transducer head. The length of the yarn defect will thus depend on speed. Thus, a small defect, at low yarn speed will provide a signal from the transducer which will persist for a longer period of time than at high yarn speed. This possibility of error in the determination of the length of the yarn defects in machines for winding, or rewinding, having variable yarn speeds, can be removed by suitably setting the threshold value of the second (time responsive) discriminator. The ordinary yarn test apparatus, however, is not so constructed that errors arising due to speed of yarn winding can be excluded in measuring the extent of yarn defects. This inability to provide an output signal which even approximately reflects the actual length of a defect is particularly bothersome during the time interval when the machine is turned on, that is, after shut-down, and until the winding spindle has reached full normal running speed. Yarn testing apparatus combined with a cutter to provide, eventually, yarn of uniform thickness requires that the spindle is stopped after each cut of the yarn; after each cut the machine will start up and each start-up may cause erroneous operation, thus contributing to additional starts and stops.

It has been proposed to directly measure the yarn speed, or the speed of the wind-up spindle, for example by means of a tachometer generator. A compensating, or error voltage, corresponding to the yarn speed is then generated to control the threshold level of the second, time-sensitive discriminator. Such arrangements are technically complicated and expensive, and therefore have not been used to a substantial extent in industry.

It is an object of the present invention to provide a filamentary material detector, particularly yarn thickness detector, in which speed variations due to start-up of the spindle are compensated, and which is simple and easy to construct and requires no modification of existing machinery.

SUBJECT MATTER OF THE PRESENT INVENTION

Briefly, a standard thickness detector is used which has a wave shaping and signal transfer circuit, connected to receive an input signal from a yarn thickness transducer gauge and to deliver an output signal, representative of input signal characteristics with respect to: (a) input signal level and (b) input signal time duration. In accordance with the present invention, the signal transfer characteristics of the wave shaping and signal transfer circuit is altered in accordance with a function which is inversely analogous to the acceleration curve, or acceleration characteristics of the thread delivery device upon start-up, so that speed variations of the thread delivery device, upon starting, are electronically compensated. According to an aspect of the invention, in its simplest form, an R-C network is connected to the second, time-sensitive discriminator to set the threshold level, variably, to approximately simulate the acceleration curve or characteristic of the thread delivery device.

By control of the threshold value of the second discriminator during start-up of the thread delivery device, signals corresponding to yarn defects are transmitted, or suppressed, respectively, as desired in accordance with their length, and independent of the time that these defects are exposed to the sensing head. Practical experiments have shown that up to 99 percent of erroneous thread defect indications, previously occurring during start of spooling of the yarn could be avoided. Thus, not only are unnecessary cuts in the yarn avoided, but the overall output of the machine, due to its lower stopping and start-up frequency is improved.

The invention will be described by way of example with reference to the accompanying drawings, wherein.

Figure 1:
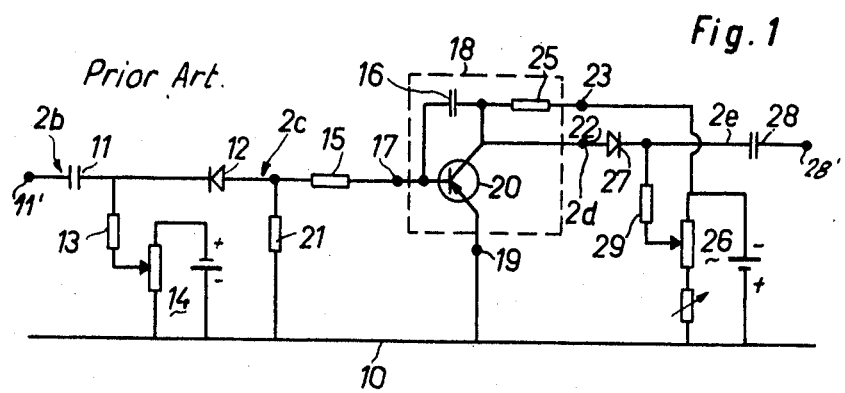
FIG. 1 is the basic circuit diagram of a signal transfer circuit in accordance with the prior art.

Yarn passes through a measuring or sensing head, of well known construction, which need not be further described or shown since it is a standard article in the textile industry. The sensing head provides an electric output signal in the form of a voltage pulse which, after wave shaping, controls a yarn cutter to cut out sections of yarn which are oversize or defective. Since both the sensing heads, as well as the yarn cutting arrangements are well known and have been described in the prior art and are not necessary for an understanding of the present invention, they are not illustrated and only the thickness detector itself will be described in detail.

Output signals from a transducer head M (FIG. 4) of known construction, are applied to input terminal 11' (FIG. 1), and connected therefrom to a condenser 11, and to a first diode 12. Diode 12 is biased by a resistance 13 connected to a voltage source 14. The negative terminal of the voltage source is connected to a ground line 10. Condenser 11 and diode 12 form the first discriminator, and voltage source 14 delivers the first threshold potential. The level of this potential is adjustable by connecting the resistance 13 to a voltage divider as well known in the art. Diode 12 is connected over a series condenser 15 to input terminal 17 of a Miller integrator 18. A resistance 21 connects diode 12 to ground line 10. Miller integrator 18 includes a transistor 20 having its base connected to the input terminal 17, its emitter over a terminal 19 to ground line 10 and its collector connected directly to output terminal 22. A resistance 25 interconnects the collector further with terminal 23 forming a voltage supply. A condenser 16 interconnects the collector and the base. The terminal 23 is connected directly to the negative terminal of a source 26. The output terminal 22 connects to the anode of a separate diode 27, the cathode of which is connected to an output condenser 28 and, additionally, over a resistance 29 with an adjustable tap point on voltage source 26. Second diode 27 and condenser 28 form the second discriminator, and the tap point on source 26 determines the bias level, or threshold of the second discriminator.

Figure 2:
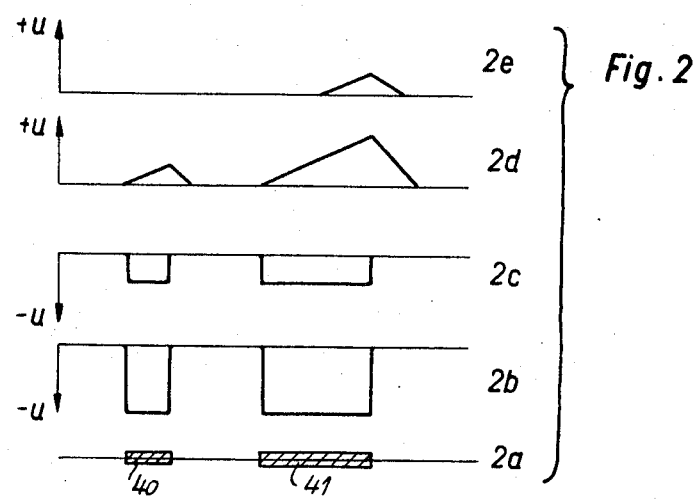
FIG. 2 illustrates, in lines 2a to 2e, consecutively, typical wave shapes of electrical signals arising in the circuit of FIG. 1.

Operation: If, in operation, a thickened portion is sensed by measuring head M (FIG. 4), a voltage pulse will be transmitted having an amplitude corresponding to the thickness, and a width corresponding to the time during which the thickened portions pass through the measuring head. FIG. 2, line 2a illustrates at 40, and 41 two thickened portions in a yarn which have the same thickness, but different lengths. The corresponding pulses sensed by measuring head M are illustrated in graph 2b; the pulses will have the same amplitude but different time duration. These pulses, appearing on condenser 11 (preferably after amplification) are transmitted over diode 12 to integrator 18 only if the absolute value of the voltage is higher than the bias threshold level taken by resistance 13 from the tap point of the voltage source 14. Thus, signals corresponding to yarn defects having an absolute value which is smaller than a predetermined level are suppressed; all those signals, however, whose amplitude is greater than the absolute value of the threshold potential are decreased in output voltage as schematically illustrated at graph 2c. Each one of the pulses from diode 12, applied to the input terminal 17 of the Miller integrator 18, are distorted depending on the relative values of resistance 15 and condenser 16. The original very steep leading and trailing flanks of the pulses are flattened to provide a gradual rise. Since the voltage rise on condenser 16 is proportional to the time duration, or width of the pulse, the condenser will be charged to a voltage level which corresponds to the width of the pulse. This is illustrated in graph 2d The detailed operation of the Miller integrator 18, itself, is well known and need not be described again.

As soon as a positive potential appears at the output terminal 22 which has an absolute value which is greater than the negative threshold voltage between diode 27 and output condenser 28, a corresponding pulse is transmitted to the output condenser 28 over the diode 27. By setting the bias across the diode 27, that is, setting a threshold level between diode 27 and output condenser 28, pulses whose absolute value is below a certain predetermined value are suppressed. As clearly appears from the graph 2d of FIG. 2, the voltage value of the pulses delivered by the Miller integrator will have a relationship with the time duration of the pulses; thus, pulses having only a short time will not reach the threshold value and will be suppressed. Only those pulses will appear at the output condenser 28, to be transmitted to a cutting device or the like (not shown) which (a) exceed, in absolute amplitude, a first threshold level and (b) exceed in time a second threshold level, corresponding to yarn defects of a predetermined thickness and length. The effect of the circuit, as looked at from the relationship of input signal from measuring head M to the output signal at terminal 28' will be to transfer the signal and operate on the signal with a characteristic function, which may be termed the signal transfer characteristic of the circuit, so that the output signal will be representative of the conditions (a) and (b) and will be appropriate to control cutting, or other apparatus.

As is immediately apparent, the measuring head M measures the time duration of yarn defects and, thus, the actual length of the yarn defects being measured depends on the speed of passage of the yarn through the measuring head. The circuit of FIG. 1 is thus operative to have its desired signal transfer characteristic with respect to a given yarn length only at a certain constant yarn speed. This is particularly disadvantageous if the spindle controlling yarn speed has to stop each time that a yarn defect is cut out, and then be re-started. During the start-up time, the yarn will have instantaneous speeds through the measuring head which are different, and slower than the predetermined running speed for which the yarn defect sensing circuit is designed. As far as the circuit is concerned, therefore, the length of yarn defects may appear to it to be greater than it actually is. As a result, output signals can be obtained from condenser 28, over a terminal 28' which are due to yarn defects of actually shorter length than those intended to be cut out, additionally contributing to stopping of the spindles than actually desired, and further contributing to additional operating interruptions.

Figure 3:
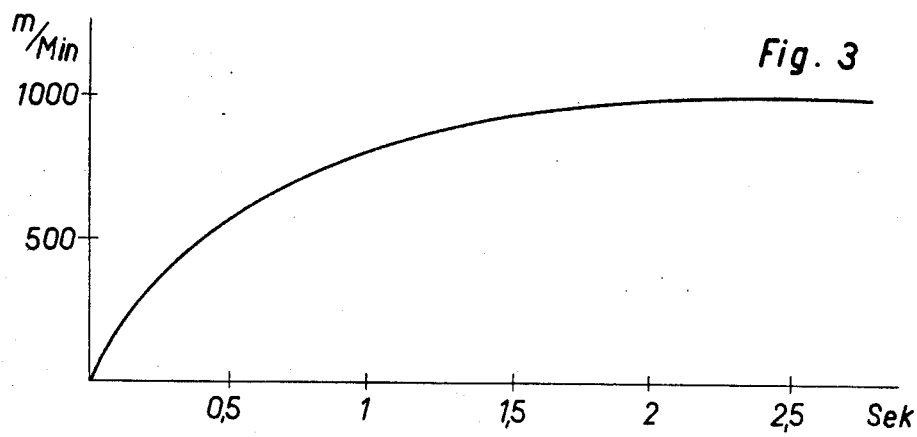
FIG. 3 is a curve of yarn speed as a function of time upon start-up of a spindle having a nominal speed of 1000 meters per minute.

It has been found that the acceleration characteristics, i.e. the acceleration curves of yarn winding devices with respect to elapsed time after start-up, i.e. as a function of time, are in principle similar. FIG. 3 illustrates such a curve for a winding machine having a nominal speed of 1000 meters/minute. By changing the value of the threshold potential across diode 27 when the spindle is stopped to a value which, absolutely measured, is greater than all the pulses to be expected at output terminal 22 of the Miller integrator, and then, upon starting the spindle, dynamically reducing this threshold potential, i.e. its signal transfer characteristic, to its predetermined nominal value at nominal spindle running speed, errors introduced due to the acceleration of the yarn after start-up will be compensated. Thus, short yarn defects which during start of the spindle would result in pulses of excessive length (with respect to pulses from similar defects when the yarn is running at nominal speed) are suppressed due to the changed level of the threshold of the second discriminator during start-up.

Figure 4:
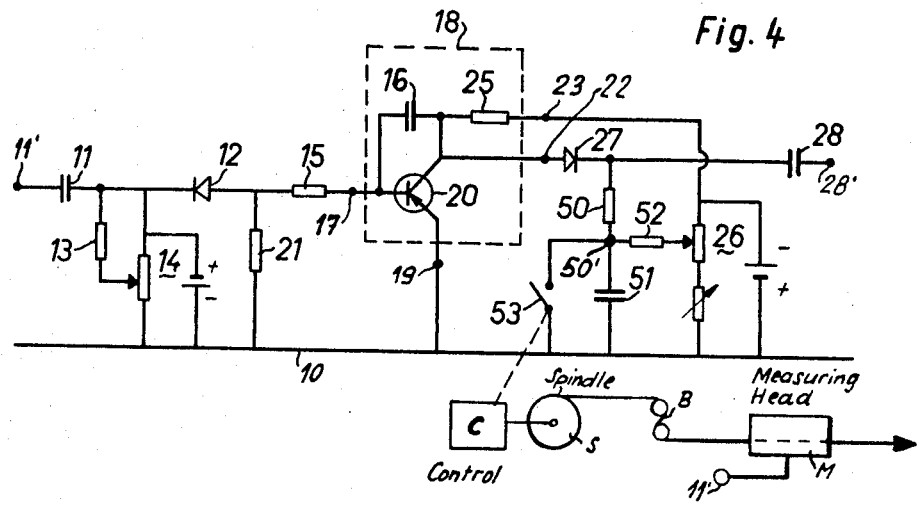
FIG. 4 is a schematic circuit diagram of a preferred form of the present invention.

The curve illustrated in FIG. 3 is an exponential function. This curve is similar to the exponential function of voltage rise on a capacitor being charged over a resistance. In accordance with the invention, as illustrated in FIG. 4, a resistance-condenser network consisting of a resistance 50, a condenser 51 and a charging resistance 52 are interconnected with diode 27. Specifically, the line between diode 27 and output condenser 28 is connected over resistance 50 to a junction 50'. Junction 50' connects to a condenser 51, and over its charging resistance 52 to the tap point of the variable voltage source 26. A switch 53, controlled by rotation of the spindle is connected in parallel to condenser 51 to short circuit the condenser. This switch may, preferably, be an electronic element. Switch 53 is controlled, for example, by the control unit C of spindle S from which thread is supplied over a balance B to pass through measuring head M. When the spindle rotates, the switch 53 is open; if the spindle stops, for example, upon break, or cutting of the thread, switch 53 closes. In all other respects the circuit is similar to that of FIG. 1 and similar elements have been given similar reference numerals and will not be discussed again. In essence, therefore, the circuit of the present invention replaces the resistance 29 (FIG. 1) setting the bias level of the second discriminator.

Operation: When the spindle is stopped, that is, when the yarn speed is zero, and switch 53 is closed, then the interconnection between diode 27 and output condenser 28 is connected over resistance 50, and switch 53, to ground line 10. The voltage across diode 27 will then correspond to the full voltage of bias source 26 which is substantially higher than the voltage of the bias level set when the thread is delivered at nominal speed. Thus, practically no signals can be transmitted from diode 27 to output condenser 28. As soon as the spindle starts to turn, that is, upon start-up, and yarn begins to run through the measuring head, switch 53 will open, causing charging of the condenser 51 over charging resistance 52. The connecting line between diode 27 and condenser 28 will be biased by an amount which decreases as the charge on the condenser increases, so that the threshold level to cause transmission of a pulse from diode 27 to condenser 28 will decrease, permitting passage of pulses of decreasing time duration.

Figure 5:
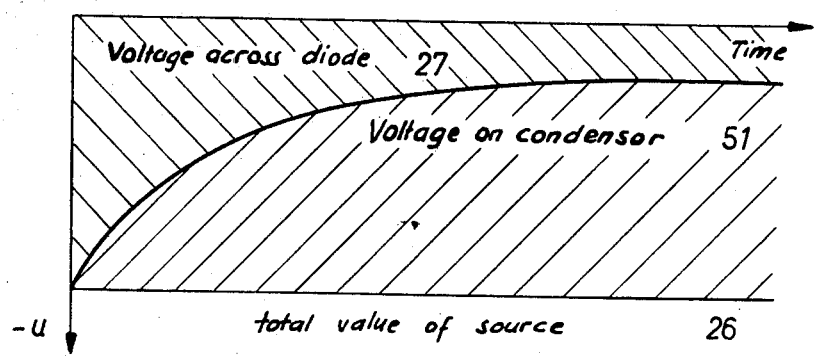
FIG. 5 is a voltage-time diagram illustrating voltages arising at the second discriminator.

FIG. 5 illustrates in the portion above the curve the voltage across diode 27; the portion below the curve illustrates the voltage on condenser 51, the origin of the curve from the origin of the coordinates indicating the total value of source 26.

By suitable choice of the charging resistance 52 and the condenser 51, the time constant and time-charge curve on the condenser can be matched to the acceleration curve, or acceleration function of the thread delivery device, typically the spindle, of the apparatus with which the thickness detector is to operate. Thus, the signal transfer characteristics of the entire circuit, and in particular the signal transfer characteristic of the second discriminator will, at any instance of time, be coordinated with yarn speed so that only those defect signals are transmitted to the output terminal 28' which have a length which, when the yarn runs at nominal speed, would normally cause transmission of the signal.

The present invention has been illustrated and specifically described in connection with yarn winding apparatus; various changes and modifications may be made, within the scope of the inventive concept, as required by specific applications, for example, in connection with other filamentary materials.

A measuring head suitable for use in the present invention is illustrated and described in U.S. Pat. No. 3,264,922.

I claim:

1. Filament material thickness detector in which a yarn delivery device including a spindle (S), having a predetermined start-up acceleration characteristic, passes yarn through a measuring head (M), the measuring head having a measuring head output and providing a signal thereat representative of thickness;

wave shaping and signal transfer means connected to the measuring head output terminal having a predetermined signal transfer characteristic and delivering an output signal which is a function of input signal characteristics with respect to:
a. input signal level and
b. input signal time duration;

means (C) providing a spindle signal indicative of start-up of the spindle after stopping;

said detector comprising means (51, 52, 53) controlled by the spindle signal connected to and continuously varying the signal transfer characteristics from start-up of the spindle, of said wave shaping and signal transfer circuit means in accordance with a function inversely analogous to the acceleration characteristic of the spindle upon start-up of the spindle, to compensate for distortion of the functional relationship of the output signal with respect to the input signal characteristics, due to speed variation of the yarn passing through the measuring head upon start-up of the spindle.

2. Detector according to claim 1 wherein said signal transfer characteristic altering means comprises a condenser (51) and a switch (53) in parallel therewith, the switch connecting the condenser in circuit with the wave shaping and signal transfer circuit means upon start-up whereby the signal transfer characteristics of said wave shaping and signal transfer circuit means is additionally affected by the charging current-time characteristics of the condenser.

3. Detector according to claim 2 including a resistance (52) connected to the condenser and, with said condenser, forming an R-C network, the time constants of the R-C network being matched to the start-up time function of said thread delivery device.

4. Detector according to claim 3 wherein the time constant is selected to be about 2.5 seconds.

5. Detector according to claim 1 wherein the input signals are pulses;

and the wave shaping and signal transfer circuit means comprises a first threshold circuit (11, 12, 14), setting a first response level to suppress input signals of an amplitude below a first predetermined level and to select only signals exceeding said first level;

circuit means (18) to change the wave shape of the pulses exceeding said first predetermined level into waves having leading and trailing flanks, respectively, which are essentially evenly rising and falling, respectively;

and a second threshold circuit (27, 28, 26), setting a second response level to waves of an amplitude below a second predetermined level to select only signals whose rise time exceeds said second level;

and said signal transfer characteristics altering means comprises means connected to said second threshold circuit and progressively changing the threshold level from a high value to said second predetermined level upon start-up of said device, and raising said threshold level to said high value upon stopping of said device.

6. Detector according to claim 5 wherein said second threshold circuit comprises a diode (27) having the output of said wave shape changing circuit means (18) applied thereto, and bias means (26) biasing said diode;

and said means progressively changing the threshold level comprising a condenser (51) having one terminal connected to one terminal of said bias means and a charging resistance (52) interconnecting the other terminal of said condenser to an intermediate terminal of said bias source (26);

and a connection (50, 50') over said condenser, with said diode to bias said diode;

and a switch means closing upon cessation of operation of said thread delivery device, connected across said condenser (51) and circuit means to apply full voltage of said bias source across the diode (27) when said switch is closed and provide for said second predetermined level when the switch is open and said condenser has been fully charged, the change-over between said full voltage and said second level, upon opening of said switch, being in accordance with the charging rate of said condenser over said charging resistance (52).

7. Detector according to claim 6 wherein the values of the condenser (51) and the charging resistance (52) are selected to provide a full charge across said condenser at about the same time when said thread delivery device has reached full speed after standstill.

8. Detector according to claim 6 wherein the values of the condenser (51) and the charging resistance (52) are selected to provide full charge across the condenser about 2.5 seconds after opening of the switch.

9. Detector according to claim 1 in combination with a thread delivery device including a spindle (S) and a measuring head (M), said measuring head being interconnected with said input terminal, the spindle signal generating means including a switch which changes state upon spindle start-up.

10. Detector according to claim 5 in combination with a yarn delivery device comprising a spindle and a measuring head, said measuring head being connected to said input terminal, the spindle signal generating means including a switch which changes state upon spindle start-up.

* * * * *